US012739587B2

(12) United States Patent

Tsuji et al.

(10) Patent No.: US 12,739,587 B2
(45) Date of Patent: *Sep. 15, 2026

(54) AUDIO PROCESSING DEVICE AND METHOD THEREFOR

(71) Applicant: SONY GROUP CORPORATION, Tokyo (JP)

(72) Inventors: Minoru Tsuji, Chiba (JP); Toru Chinen, Kanagawa (JP)

(73) Assignee: SONY GROUP CORPORATION, Tokyo (JP)

(*) Notice: Subject to any disclaimer, the term of this patent is extended or adjusted under 35 U.S.C. 154(b) by 190 days.

This patent is subject to a terminal disclaimer.

(21) Appl. No.: 18/784,323

(22) Filed: Jul. 25, 2024

(65) Prior Publication Data

US 2024/0381050 A1 Nov. 14, 2024

Related U.S. Application Data

(63) Continuation of application No. 18/302,120, filed on Apr. 18, 2023, now Pat. No. 12,096,201, which is a (Continued)

(30) Foreign Application Priority Data

Jan. 16, 2014 (JP) ................................. 2014-005656

(51) Int. Cl.

| | |
|---|---|
| ***H04S 7/00*** | (2006.01) |
| ***H04S 3/00*** | (2006.01) |
| *H04R 1/40* | (2006.01) |

(52) U.S. Cl.

CPC .............. *H04S 7/302* (2013.01); *H04S 3/008* (2013.01); *H04S 7/307* (2013.01); *H04R 1/40* (2013.01);

(Continued)

(58) Field of Classification Search

CPC ....... H04S 7/302; H04S 7/303; H04S 2400/11

See application file for complete search history.

(56) References Cited

U.S. PATENT DOCUMENTS 8,036,767 B2 10/2011 Soulodre
8,213,621 B2 7/2012 Bruno et al.

(Continued)

FOREIGN PATENT DOCUMENTS

CN 1625302 A 6/2005
CN 1625305 A 6/2005

(Continued)

OTHER PUBLICATIONS

Ville Pulkki, "Virtual Sound Source Positioning Using Vector Based Amplitude Planning", Journal of the Audio Engineering Society, Audio Engineering Society, Inc., Laboratory of Acoustics and Audio Signal Processing, Helsinki University of Technology, Finland, vol. 45, No. 6, Jun. 1997, pp. 456-466.

(Continued)

*Primary Examiner* — Kile O Blair

(74) *Attorney, Agent, or Firm* — CHIP LAW GROUP

(57) ABSTRACT

An input unit receives input of an assumed listening position of sound of an object, which is a sound source, and outputs assumed listening position information indicating the assumed listening position. A position information correction unit corrects position information of each object on the basis of the assumed listening position information to obtain corrected position information. A gain/frequency characteristic correction unit performs gain correction and frequency characteristic correction on a waveform signal of an object on the basis of the position information and the corrected position information. A spatial acoustic characteristic addition unit further adds a spatial acoustic characteristic to the waveform signal resulting from the gain correction and the frequency characteristic correction on the basis of the posi- (Continued)

tion information of the object and the assumed listening position information. The present technology is applicable to an audio processing device.

15 Claims, 8 Drawing Sheets

Related U.S. Application Data continuation of application No. 17/456,679, filed on Nov. 29, 2021, now Pat. No. 11,778,406, which is a continuation of application No. 17/062,800, filed on Oct. 5, 2020, now Pat. No. 11,223,921, which is a continuation of application No. 16/883,004, filed on May 26, 2020, now Pat. No. 10,812,925, which is a continuation of application No. 16/392,228, filed on Apr. 23, 2019, now Pat. No. 10,694,310, which is a continuation of application No. 15/110,176, filed as application No. PCT/JP2015/050092 on Jan. 6, 2015, now Pat. No. 10,477,337.

(52) U.S. Cl.
CPC ....... *H04S 2400/01* (2013.01); *H04S 2400/11* (2013.01); *H04S 2400/13* (2013.01)

(56) References Cited

U.S. PATENT DOCUMENTS

| | | | |
|---|---|---|---|
| 9,215,542 | B2 | 12/2015 | Silzle et al. |
| 2005/0117753 | A1 | 6/2005 | Miura et al. |
| 2006/0045295 | A1 | 3/2006 | Kim |
| 2006/0088174 | A1 | 4/2006 | Deleeuw et al. |
| 2006/0109986 | A1 | 5/2006 | Ko |
| 2008/0319765 | A1 | 12/2008 | Oh et al. |
| 2009/0006106 | A1 | 1/2009 | Pang et al. |
| 2010/0080396 | A1 | 4/2010 | Aoyagi |
| 2011/0286601 | A1 | 11/2011 | Fukui et al. |
| 2012/0230525 | A1 | 9/2012 | Higuchi et al. |
| 2013/0259236 | A1 | 10/2013 | Chon et al. |
| 2013/0329922 | A1 | 12/2013 | Lemieux et al. |
| 2015/0189457 | A1 | 7/2015 | Donaldson |
| 2016/0050508 | A1 | 2/2016 | Redmann |

FOREIGN PATENT DOCUMENTS

| | | | |
|---|---|---|---|
| CN | 102325298 | A | 1/2012 |
| CN | 102685419 | A | 9/2012 |
| EP | 0666556 | A2 | 8/1995 |
| EP | 1819198 | A1 | 8/2007 |
| EP | 1974343 | A1 | 10/2008 |
| EP | 1974344 | A1 | 10/2008 |
| JP | 06-189399 | A | 7/1994 |
| JP | 06-315200 | A | 11/1994 |
| JP | 07-312800 | A | 11/1995 |
| JP | 09-046800 | A | 2/1997 |
| JP | 2000-069600 | A | 3/2000 |
| JP | 2004-032726 | A | 1/2004 |
| JP | 2005-094271 | A | 4/2005 |
| JP | 2005-167612 | A | 6/2005 |
| JP | 2006-287606 | A | 10/2006 |
| JP | 2008-072541 | A | 3/2008 |
| JP | 2009-524103 | A | 6/2009 |
| JP | 4551652 | B2 | 9/2010 |
| JP | 2011-188248 | A | 9/2011 |
| JP | 2012019506 | A | 1/2012 |
| JP | 2012-054698 | A | 3/2012 |
| JP | 2012-191524 | A | 10/2012 |
| JP | 5147727 | B2 | 2/2013 |
| JP | 5161109 | B2 | 3/2013 |
| JP | 7367785 | B2 | 10/2023 |
| KR | 10-2005-0053313 | A | 6/2005 |
| KR | 10-2006-0019013 | A | 3/2006 |
| KR | 10-2008-0042128 | A | 5/2008 |
| KR | 10-2008-0086445 | A | 9/2008 |
| KR | 10-2008-0087909 | A | 10/2008 |
| NL | 1029786 | C2 | 12/2009 |
| WO | 2007/083957 | A1 | 7/2007 |
| WO | 2007/083958 | A1 | 7/2007 |

OTHER PUBLICATIONS

Office Action for JP Patent Application No. 2020-105277, issued on Jun. 8, 2021, 03 pages of Office Action and 03 pages of English Translation.
Non-Final Office Action for U.S. Appl. No. 15/110,176, issued on Jan. 2, 2019, 10 pages.
Advisory Action for U.S. Appl. No. 15/110,176, issued on Oct. 29, 2018, 02 pages.
Final Office Action for U.S. Appl. No. 15/110,176, issued on Aug. 9, 2018, 18 pages.
Non-Final Office Action for U.S. Appl. No. 15/110,176, issued on Feb. 2, 2018, 10 pages.
Advisory Action for U.S. Appl. No. 15/110,176, issued on Dec. 8, 2017, 03 pages.
Final Office Action for U.S. Appl. No. 15/110,176, issued on Sep. 8, 2017, 10 pages.
Non-Final Office Action for U.S. Appl. No. 15/110,176, issued on Feb. 1, 2017, 08 pages.
Office Action for EP Patent Application No. 15737737.5, issued on Nov. 6, 2018, 09 pages of Office Action.
Jyri Huopaniemi, "Virtual Acoustics and 3-D Sound in Multimedia Signal Processing", Helsinki University of Technology, Laboratory of Acoustics and Audio Signal Processing, Report 53, 189 pages.
International Search Report and Written Opinion of PCT Application No. PCT/JP2015/050092, issued on Feb. 3, 2015, 06 pages of English Translation and 06 pages of ISRWO.
International Preliminary Report on Patentability of PCT Application No. PCT/JP2015/050092, issued on Jul. 28, 2016, 07 pages of English Translation and 04 pages of IPRP.
Non-Final Office Action for U.S. Appl. No. 16/392,228, issued on Sep. 9, 2019, 07 pages.
Notice of Allowance for U.S. Appl. No. 16/392,228, issued on Feb. 20, 2020, 08 pages.
Notice of Allowance for U.S. Appl. No. 16/392,228, issued on Apr. 24, 2020, 02 pages.
Notice of Allowance for U.S. Appl. No. 15/110,176, issued on Aug. 7, 2019, 02 pages.
Notice of Allowance for U.S. Appl. No. 15/110,176, issued on Jul. 3, 2019, 05 pages.
Notice of Allowance for U.S. Appl. No. 15/110,176, issued on Oct. 11, 2019, 02 pages.
Blauert, et al., "Providing surround sound with Loudspeakers: A synopsis of current Methods", Archivers of Acoustics, vol. 37, No. 1, XP055677944, Jan. 1, 2012, pp. 5-18.
Extended European Search Report of EP Application No. 20154698.3, issued on Mar. 27, 2020, 12 pages.
Office Action for CN Patent Application No. 201580004043.X, issued on Oct. 30, 2019, 05 pages of Office Action and 09 pages of English Translation.
Office Action for CN Patent Application No. 201580004043.X, issued on May 14, 2019, 06 pages of Office Action and 02 pages of English Translation.
Office Action for JP Patent Application No. 2015-557783, issued on Mar. 7, 2019, 04 pages of Office Action and 03 pages of English Translation.
Notice of Allowance for U.S. Appl. No. 16/883,004, issued on Jun. 17, 2020, 09 pages.
Notice of Allowance for U.S. Appl. No. 16/883,004, issued on Aug. 14, 2020, 04 pages.
Notice of Allowance for U.S. Appl. No. 17/062,800, issued on Oct. 14, 2021, 02 pages.
Notice of Allowance for U.S. Appl. No. 17/062,800, issued on Sep. 9, 2021, 05 pages.

(56) References Cited

OTHER PUBLICATIONS

Notice of Allowance for U.S. Appl. No. 17/456,679, issued on Jan. 18, 2023, 05 pages.
Non-Final Office Action for U.S. Appl. No. 17/456,679, issued on Sep. 16, 2022, 05 pages.
Notice of Allowance for U.S. Appl. No. 17/456,679, issued on May 15, 2023, 05 pages.
Non-Final Office Action for U.S. Appl. No. 18/302,120, issued on Feb. 15, 2024, 06 pages.
Notice of Allowance for U.S. Appl. No. 18/302,120, issued on Jun. 17, 2024, 05 pages.
Notice of Allowance for U.S. Appl. No. 17/456,679, issued on Aug. 16, 2023, 02 pages.

AUDIO PROCESSING DEVICE AND METHOD THEREFOR

CROSS REFERENCE TO RELATED APPLICATIONS

The present application is a continuation application of U.S. patent application Ser. No. 18/302,120, filed Apr. 18, 2023, which is a continuation application of U.S. patent application Ser. No. 17/456,679, filed Nov. 29, 2021, now U.S. Pat. No. 11,778,406, which is a continuation of U.S. patent application Ser. No. 17/062,800, filed Oct. 5, 2020, now U.S. Pat. No. 11,223,921, which is a continuation of U.S. patent application Ser. No. 16/883,004, filed May 26, 2020, now U.S. Pat. No. 10,812,925, which is a continuation of U.S. patent application Ser. No. 16/392,228, filed Apr. 23, 2019, now U.S. Pat. No. 10,694,310, which is a continuation of U.S. patent application Ser. No. 15/110,176, filed Jul. 7, 2016, now U.S. Pat. No. 10,477,337, which is a National Stage Entry of Patent Application No. PCT/JP2015/050092 filed Jan. 6, 2015, which claims priority from prior Japanese Patent Application JP 2014-005656 filed in the Japan Patent Office on Jan. 16, 2014, the entire contents of which are hereby incorporated by reference.

TECHNICAL FIELD

The present technology relates to an audio processing device, a method therefor, and a program therefor, and more particularly to an audio processing device, a method therefor, and a program therefor capable of achieving more flexible audio reproduction.

BACKGROUND ART

Audio contents such as those in compact discs (CDs) and digital versatile discs (DVDs) and those distributed over networks are typically composed of channel-based audio.

A channel-based audio content is obtained in such a manner that a content creator properly mixes multiple sound sources such as singing voices and sounds of instruments onto two channels or 5.1 channels (hereinafter also referred to as ch). A user reproduces the content using a 2ch or 5.1ch speaker system or using headphones.

There are, however, an infinite variety of users' speaker arrangements or the like, and sound localization intended by the content creator may not necessarily be reproduced.

In addition, object-based audio technologies are recently receiving attention. In object-based audio, signals rendered for the reproduction system are reproduced on the basis of the waveform signals of sounds of objects and metadata representing localization information of the objects indicated by positions of the objects relative to a listening point that is a reference, for example. The object-based audio thus has a characteristic in that sound localization is reproduced relatively as intended by the content creator.

For example, in object-based audio, such a technology as vector base amplitude panning (VBAP) is used to generate reproduction signals on channels associated with respective speakers at the reproduction side from the waveform signals of the objects (refer to non-patent document 1, for example).

In the VBAP, a localization position of a target sound image is expressed by a linear sum of vectors extending toward two or three speakers around the localization position. Coefficients by which the respective vectors are multiplied in the linear sum are used as gains of the waveform signals to be output from the respective speakers for gain control, so that the sound image is localized at the target position.

CITATION LIST

Non-Patent Document

Non-patent Document 1: Ville Pulkki, "Virtual Sound Source Positioning Using Vector Base Amplitude Panning", Journal of AES, vol. 45, no. 6, pp. 456-466, 1997

SUMMARY OF THE INVENTION

Problems to be Solved by the Invention

In both of the channel-based audio and the object-based audio described above, however, localization of sound is determined by the content creator, and users can only hear the sound of the content as provided. For example, at the content reproduction side, such a reproduction of the way in which sounds are heard when the listening point is moved from a back seat to a front seat in a live music club cannot be provided.

With the aforementioned technologies, as described above, it cannot be said that audio reproduction can be achieved with sufficiently high flexibility.

The present technology is achieved in view of the aforementioned circumstances, and enables audio reproduction with increased flexibility.

Solutions to Problems

An audio processing device according to one aspect of the present technology includes: a position information correction unit configured to calculate corrected position information indicating a position of a sound source relative to a listening position at which sound from the sound source is heard, the calculation being based on position information indicating the position of the sound source and listening position information indicating the listening position; and a generation unit configured to generate a reproduction signal reproducing sound from the sound source to be heard at the listening position, based on a waveform signal of the sound source and the corrected position information.

The position information correction unit may be configured to calculate the corrected position information based on modified position information indicating a modified position of the sound source and the listening position information.

The audio processing device may further be provided with a correction unit configured to perform at least one of gain correction and frequency characteristic correction on the waveform signal depending on a distance from the sound source to the listening position.

The audio processing device may further be provided with a spatial acoustic characteristic addition unit configured to add a spatial acoustic characteristic to the waveform signal, based on the listening position information and the modified position information.

The spatial acoustic characteristic addition unit may be configured to add at least one of early reflection and a reverberation characteristic as the spatial acoustic characteristic to the waveform signal.

The audio processing device may further be provided with a spatial acoustic characteristic addition unit configured to add a spatial acoustic characteristic to the waveform signal, based on the listening position information and the position information.

The audio processing device may further be provided with a convolution processor configured to perform a convolution process on the reproduction signals on two or more channels generated by the generation unit to generate reproduction signals on two channels.

An audio processing method or program according to one aspect of the present technology includes the steps of: calculating corrected position information indicating a position of a sound source relative to a listening position at which sound from the sound source is heard, the calculation being based on position information indicating the position of the sound source and listening position information indicating the listening position; and generating a reproduction signal reproducing sound from the sound source to be heard at the listening position, based on a waveform signal of the sound source and the corrected position information.

In one aspect of the present technology, corrected position information indicating a position of a sound source relative to a listening position at which sound from the sound source is heard is calculated based on position information indicating the position of the sound source and listening position information indicating the listening position, and a reproduction signal reproducing sound from the sound source to be heard at the listening position is generated based on a waveform signal of the sound source and the corrected position information.

Effects of the Invention

According to one aspect of the present technology, audio reproduction with increased flexibility is achieved.

The effects mentioned herein are not necessarily limited to those mentioned here, but may be any effect mentioned in the present disclosure.

MODE FOR CARRYING OUT THE INVENTION

Embodiments to which the present technology is applied will be described below with reference to the drawings.

First Embodiment

<Example Configuration of Audio Processing Device>

The present technology relates to a technology for reproducing audio to be heard at a certain listening position from a waveform signal of sound of an object that is a sound source at the reproduction side.

Figure 1:
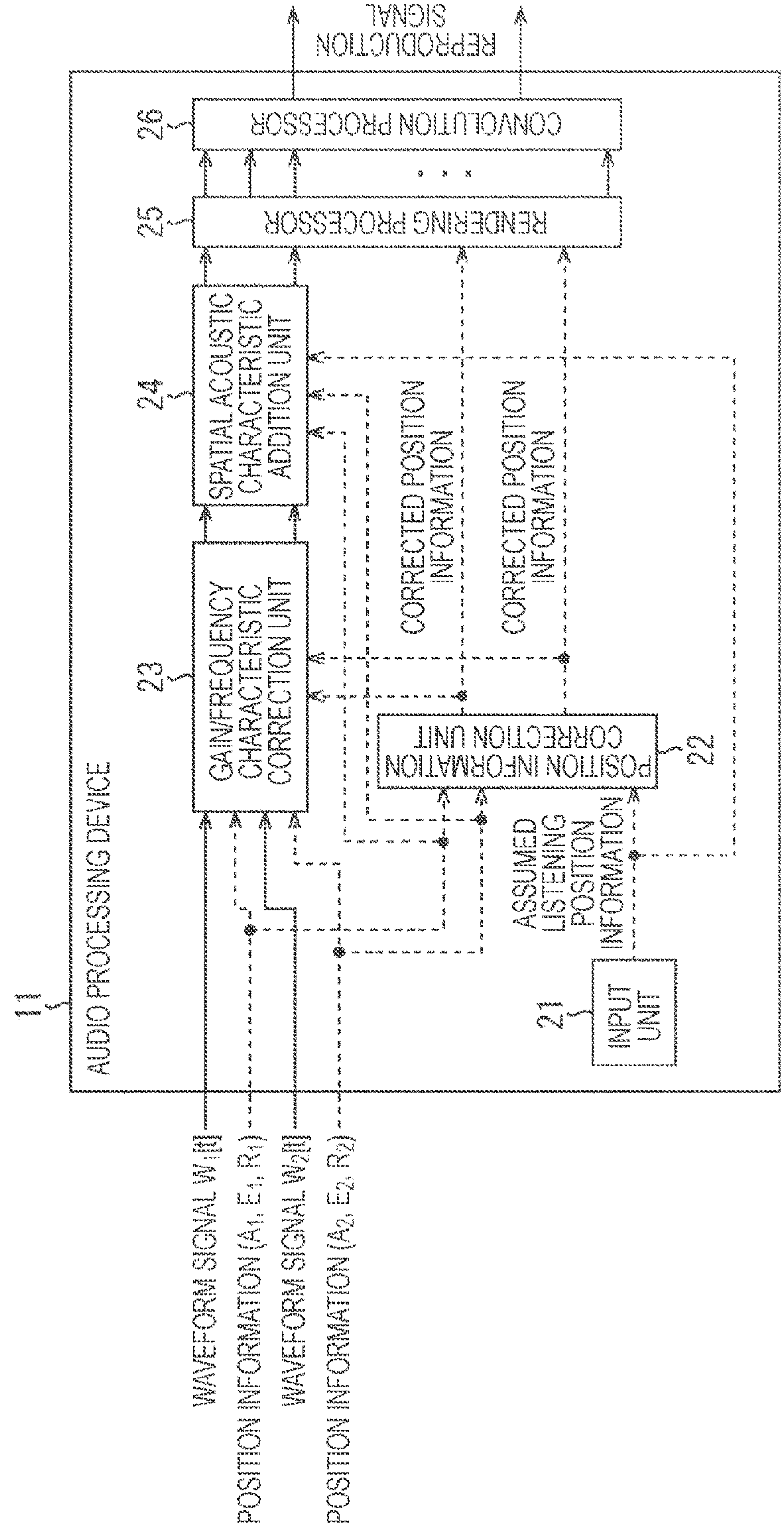
FIG. 1 is a diagram illustrating a configuration of an audio processing device.

FIG. 1 is a diagram illustrating an example configuration according to an embodiment of an audio processing device to which the present technology is applied.

An audio processing device 11 includes an input unit 21, a position information correction unit 22, a gain/frequency characteristic correction unit 23, a spatial acoustic characteristic addition unit 24, a rendering processor 25, and a convolution processor 26.

Waveform signals of multiple objects and metadata of the waveform signals, which are audio information of contents to be reproduced, are supplied to the audio processing device 11.

Note that a waveform signal of an object refers to an audio signal for reproducing sound emitted by an object that is a sound source.

In addition, metadata of a waveform signal of an object refers to the position of the object, that is, position information indicating the localization position of the sound of the object. The position information is information indicating the position of an object relative to a standard listening position, which is a predetermined reference point.

The position information of an object may be expressed by spherical coordinates, that is, an azimuth angle, an elevation angle, and a radius with respect to a position on a spherical surface having its center at the standard listening position, or may be expressed by coordinates of an orthogonal coordinate system having the origin at the standard listening position, for example.

An example in which position information of respective objects are expressed by spherical coordinates will be described below. Specifically, the position information of an n-th (where n=1, 2, 3, . . . ) object $OB_n$ is expressed by the azimuth angle $A_n$, the elevation angle $E_n$, and the radius $R_n$ with respect to an object $OB_n$ on a spherical surface having its center at the standard listening position. Note that the unit of the azimuth angle $A_n$ and the elevation angle $E_n$ is degree, for example, and the unit of the radius $R_n$ is meter, for example.

Hereinafter, the position information of an object $OB_n$ will also be expressed by ($A_n$, $E_n$, $R_n$). In addition, the waveform signal of an n-th object $OB_n$ will also be expressed by a waveform signal $W_n[t]$.

Thus, the waveform signal and the position of the first object $OB_1$ will be expressed by $W_1$ [t] and ($A_1$, $E_1$, $R_1$), respectively, and the waveform signal and the position information of the second object $OB_2$ will be expressed by $W_2$ [t] and ($A_2$, $E_2$, $R_2$), respectively, for example. Hereinafter, for ease of explanation, the description will be continued on the assumption that the waveform signals and the position information of two objects, which are an object $OB_1$ and an object $OB_2$, are supplied to the audio processing device 11.

The input unit 21 is constituted by a mouse, buttons, a touch panel, or the like, and upon being operated by a user, outputs a signal associated with the operation. For example, the input unit 21 receives an assumed listening position input by a user, and supplies assumed listening position information indicating the assumed listening position input by the user to the position information correction unit 22 and the spatial acoustic characteristic addition unit 24.

Note that the assumed listening position is a listening position of sound constituting a content in a virtual sound field to be reproduced. Thus, the assumed listening position can be said to indicate the position of a predetermined standard listening position resulting from modification (correction).

The position information correction unit 22 corrects externally supplied position information of respective objects on the basis of the assumed listening position information supplied from the input unit 21, and supplies the resulting corrected position information to the gain/frequency characteristic correction unit 23 and the rendering processor 25. The corrected position information is information indicating the position of an object relative to the assumed listening position, that is, the sound localization position of the object.

The gain/frequency characteristic correction unit 23 performs gain correction and frequency characteristic correction of the externally supplied waveform signals of the objects on the basis of corrected position information supplied from the position information correction unit 22 and the position information supplied externally, and supplies the resulting waveform signals to the spatial acoustic characteristic addition unit 24.

The spatial acoustic characteristic addition unit 24 adds spatial acoustic characteristics to the waveform signals supplied from the gain/frequency characteristic correction unit 23 on the basis of the assumed listening position information supplied from the input unit 21 and the externally supplied position information of the objects, and supplies the resulting waveform signals to the rendering processor 25.

The rendering processor 25 performs mapping on the waveform signals supplied from the spatial acoustic characteristic addition unit 24 on the basis of the corrected position information supplied from the position information correction unit 22 to generate reproduction signals on M channels, M being 2 or more. Thus, reproduction signals on M channels are generated from the waveform signals of the respective objects. The rendering processor 25 supplies the generated reproduction signals on M channels to the convolution processor 26.

The thus obtained reproduction signals on M channels are audio signals for reproducing sounds output from the respective objects, which are to be reproduced by M virtual speakers (speakers of M channels) and heard at an assumed listening position in a virtual sound field to be reproduced.

The convolution processor 26 performs convolution process on the reproduction signals on M channels supplied from the rendering processor 25 to generate reproduction signals of 2 channels, and outputs the generated reproduction signals. Specifically, in this example, the number of speakers at the reproduction side is two, and the convolution processor 26 generates and outputs reproduction signals to be reproduced by the speakers.

<Generation of Reproduction Signals>

Next, reproduction signals generated by the audio processing device 11 illustrated in FIG. 1 will be described in more detail.

As mentioned above, an example in which the waveform signals and the position information of two objects, which are an object $OB_1$ and an object $OB_2$, are supplied to the audio processing device 11 will be described here.

For reproduction of a content, a user operates the input unit 21 to input an assumed listening position that is a reference point for localization of sounds from the respective objects in rendering.

Herein, a moving distance X in the left-right direction and a moving distance Y in the front-back direction from the standard listening position are input as the assumed listening position, and the assumed listening position information is expressed by (X, Y). The unit of the moving distance X and the moving distance Y is meter, for example.

Specifically, in an xyz coordinate system having the origin O at the standard listening position, the x-axis direction and the y-axis direction in horizontal directions, and the z-axis direction in the height direction, a distance X in the x-axis direction from the standard listening position to the assumed listening position and a distance Y in the y-axis direction from the standard listening position to the assumed listening position are input by the user. Thus, information indicating a position expressed by the input distances X and Y relative to the standard listening position is the assumed listening position information (X, Y). Note that the xyz coordinate system is an orthogonal coordinate system.

Although an example in which the assumed listening position is on the xy plane will be described herein for ease of explanation, the user may alternatively be allowed to specify the height in the z-axis direction of the assumed listening position. In such a case, the distance X in the x-axis direction, the distance Y in the y-axis direction, and the distance Z in the z-axis direction from the standard listening position to the assumed listening position are specified by the user, which constitute the assumed listening position information (X, Y, Z). Furthermore, although it is explained above that the assumed listening position is input by a user, the assumed listening position information may be acquired externally or may be preset by a user or the like.

When the assumed listening position information (X, Y) is thus obtained, the position information correction unit 22 then calculates corrected position information indicating the positions of the respective objects on the basis of the assumed listening position.

Figure 2:
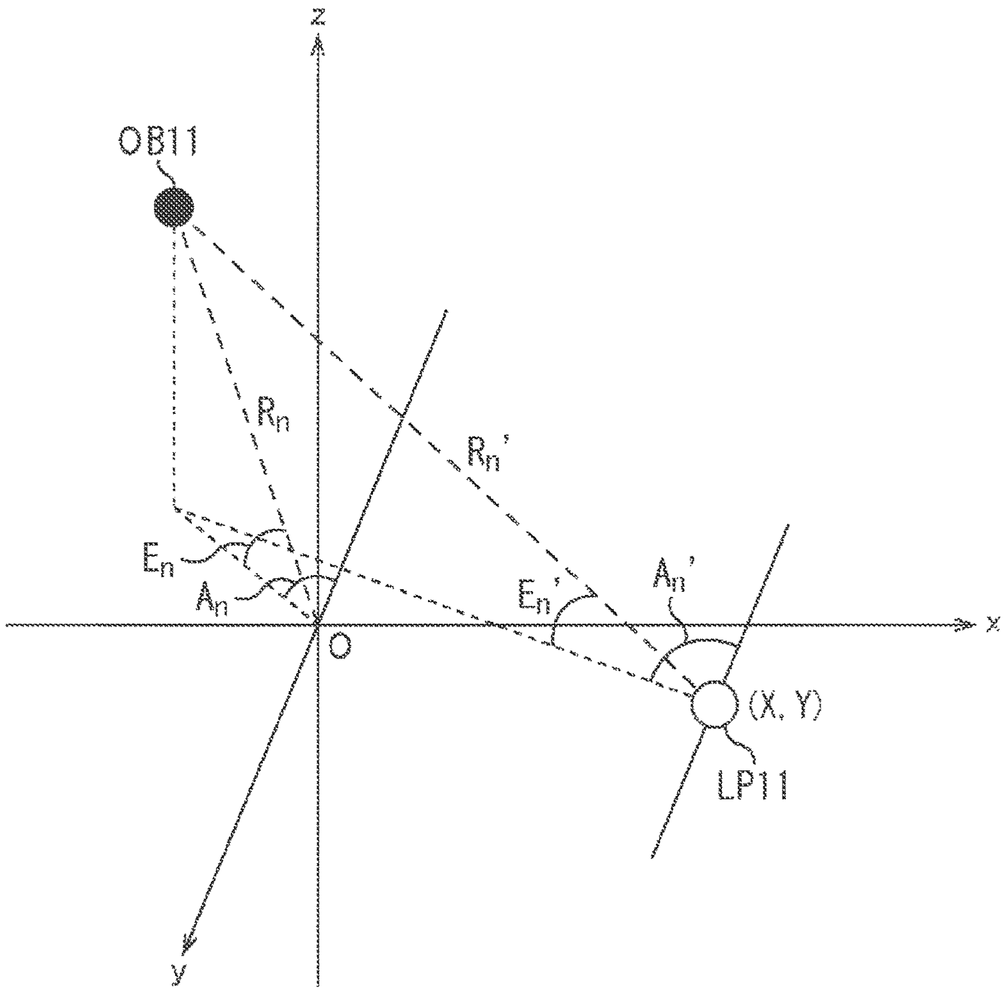
FIG. 2 is a graph explaining assumed listening position and corrected position information.

As shown in FIG. 2, for example, assume that the waveform signal and the position information of a predetermined object OB11 are supplied and the assumed listening position LP11 is specified by a user. In FIG. 2, the transverse direction, the depth direction, and the vertical direction represent the x-axis direction, the y-axis direction, and the z-axis direction, respectively.

In this example, the origin O of the xyz coordinate system is the standard listening position. Here, when the object OB11 is the n-th object, the position information indicating the position of the object OB11 relative to the standard listening position is $(A_n, E_n, R_n)$.

Specifically, the azimuth angle $A_n$ of the position information $(A_n, E_n, R_n)$ represents the angle between a line connecting the origin O and the object OB11 and the y axis on the xy plane. The elevation angle $E_n$ of the position information $(A_n, E_n, R_n)$ represents the angle between a line connecting the origin O and the object OB11 and the xy plane, and the radius $R_n$ of the position information $(A_n, E_n, R_n)$ represents the distance from the origin O to the object OB11.

Now assume that a distance X in the x-axis direction and a distance Y in the y-axis direction from the origin O to the assumed listening position LP11 are input as the assumed listening position information indicating the assumed listening position LP11.

In such a case, the position information correction unit 22 calculates corrected position information $$(A'_n, E'_n, R'_n)$$

indicating the position of the object OB11 relative to the assumed listening position LP11, that is, the position of the object OB11 based on the assumed listening position LP11 on the basis of the assumed listening position information (X, Y) and the position information ($A_n$, $E_n$, $R_n$).

Note that $$A'_n,\ E'_n,\ \text{and}\ R'_n$$

in the corrected position information ( $$(A'_n,\ E'_n,\ R'_n)$$

represent the azimuth angle, the elevation angle, and the radius corresponding to $A_n$, $E_n$, and $R_n$ of the position information ($A_n$, $E_n$, $R_n$), respectively.

Specifically, for the first object $OB_1$, the position information correction unit 22 calculates the following expressions (1) to (3) on the basis of the position information ($A_1$, $E_1$, $R_1$) of the object $OB_1$ and the assumed listening position information (X, Y) to obtain corrected position information $$(A'_1,\ E'_1,\ R'_1).$$

[Mathematical Formula 1]

$$A'_1 = \arctan\left(\frac{R_1 \cdot \cos E_1 \sin A_1 + X}{R_1 \cdot \cos E_1 \cos A_1 + Y}\right) \tag{1}$$

[Mathematical Formula 2]

$$E'_1 = \arctan\left(\frac{R_1 \cdot \sin E_1}{\sqrt{(R_1 \cdot \cos E_1 \sin A_1 + X)^2 + (R_1 \cdot \cos E_1 \cos A_1 + Y)^2}}\right) \tag{2}$$

[Mathematical Formula 3]

$$R'_1 = \sqrt{(R_1 \cdot \cos E_1 \sin A_1 + X)^2 + (R_1 \cdot \cos E_1 \cos A_1 + Y)^2 + (R_1 \cdot \sin E_1)^2} \tag{3}$$

Specifically, the azimuth angle $$A'_1$$

is obtained by the expression (1), the elevation angle $$E'_1$$

is obtained by the expression (2), and the radius $$R'_1$$

is obtained by the expression (3).

Similarly, for the second object $OB_2$, the position information correction unit 22 calculates the following expressions (4) to (6) on the basis of the position information ($A_2$, $E_2$, $R_2$) of the object $OB_2$ and the assumed listening position information (X, Y) to obtain corrected position information $$(A'_2,\ E'_2,\ R'_2).$$

[Mathematical Formula 4]

$$A'_2 = \arctan\left(\frac{R_2 \cdot \cos E_2 \sin A_2 + X}{R_2 \cdot \cos E_2 \cos A_2 + Y}\right) \tag{4}$$

[Mathematical Formula 5]

$$E'_2 = \arctan\left(\frac{R_2 \cdot \sin E_2}{\sqrt{(R_2 \cdot \cos E_2 \sin A_2 + X)^2 + (R_2 \cdot \cos E_2 \cos A_2 + Y)^2}}\right) \tag{5}$$

[Mathematical Formula 6]

$$R'_2 = \sqrt{(R_2 \cdot \cos E_2 \sin A_2 + X)^2 + (R_2 \cdot \cos E_2 \cos A_2 + Y)^2 + (R_2 \cdot \sin E_2)^2} \tag{6}$$

Specifically, the azimuth angle $$A'_2$$

is obtained by the expression (4), the elevation angle $$E'_2$$

is obtained by the expression (5), and the radius $$R'_2$$

is obtained by the expression (6).

Subsequently, the gain/frequency characteristic correction unit 23 performs the gain correction and the frequency characteristic correction on the waveform signals of the objects on the corrected position information indicating the positions of the respective objects relative to the assumed listening position and the position information indicating the positions of the respective objects relative to the standard listening position.

For example, the gain/frequency characteristic correction unit 23 calculates the following expressions (7) and (8) for the object $OB_1$ and the object $OB_2$ using the radius $$R'_1$$

and the radius $$R'_2$$

of the corrected position information and the radius $R_1$ and the radius $R_2$ of the position information to determine a gain correction amount $G_1$ and a gain correction amount $G_2$ of the respective objects.

[Mathematical Formula 7]

$$G_1 = \frac{R_1}{R_1'} \quad (7)$$

[Mathematical Formula 8]

$$G_2 = \frac{R_2}{R_2'} \quad (8)$$

Specifically, the gain correction amount $G_1$ of the waveform signal $W_1[t]$ of the object $OB_1$ is obtained by the expression (7), and the gain correction amount $G_2$ of the waveform signal $W_2[t]$ of the object $OB_2$ is obtained by the expression (8). In this example, the ratio of the radius indicated by the corrected position information to the radius indicated by the position information is the gain correction amount, and volume correction depending on the distance from an object to the assumed listening position is performed using the gain correction amount.

The gain/frequency characteristic correction unit 23 further calculates the following expressions (9) and (10) to perform frequency characteristic correction depending on the radius indicated by the corrected position information and gain correction according to the gain correction amount on the waveform signals of the respective objects.

[Mathematical Formula 9]

$$W_1'[t] = G_1 \cdot \sum_{l=0}^{L} h_l W_1[t-l] \quad (9)$$

[Mathematical Formula 10]

$$W_2'[t] = G_2 \cdot \sum_{l=0}^{L} h_l W_2[t-l] \quad (10)$$

Specifically, the frequency characteristic correction and the gain correction are performed on the waveform signal $W_1[t]$ of the object $OB_1$ through the calculation of the expression (9), and the waveform signal $$W_1'[t]$$

is thus obtained. Similarly, the frequency characteristic correction and the gain correction are performed on the waveform signal $W_2[t]$ of the object $OB_2$ through the calculation of the expression (10), and the waveform signal $$W_2'[t]$$

is thus obtained. In this example, the correction of the frequency characteristics of the waveform signals is performed through filtering.

In the expressions (9) and (10), $h_l$ (where l=0, 1, . . . , L) represents a coefficient by which the waveform signal $W_n[t-l]$ (where n=1, 2) at each time is multiplied for filtering.

When L=2 and the coefficients $h_0$, $h_1$, and $h_2$ are as expressed by the following expressions (11) to (13), for example, a characteristic that high-frequency components of sounds from the objects are attenuated by walls and a ceiling of a virtual sound field (virtual audio reproduction space) to be reproduced depending on the distances from the objects to the assumed listening position can be reproduced.

[Mathematical Formula 11]

$$h_0 = (1.0 - h_1)/2 \quad (11)$$

[Mathematical Formula 12]

$$h_1 = \begin{cases} 1.0 & (\text{where } R_n' \le R_n) \\ 1.0 - 0.5 \times (R_n' - R_n)/10 & (\text{where } R_n < R_n' < R_n + 10) \\ 0.5 & (\text{where } R_n' \ge R_n + 10) \end{cases} \quad (12)$$

[Mathematical Formula 13]

$$h_2 = (1.0 - h_1)/2 \quad (13)$$

In the expression (12), $R_n$ represents the radius $R_n$ indicated by the position information ($A_n$, $E_n$, $R_n$) of the object $OB_n$ (where n=1, 2), and $$R_n'$$

represents the radius $$R_n'$$

indicated by the corrected position information $$(A_n', E_n', R_n')$$

of the object $OB_n$ (where n=1, 2).

Figure 3:
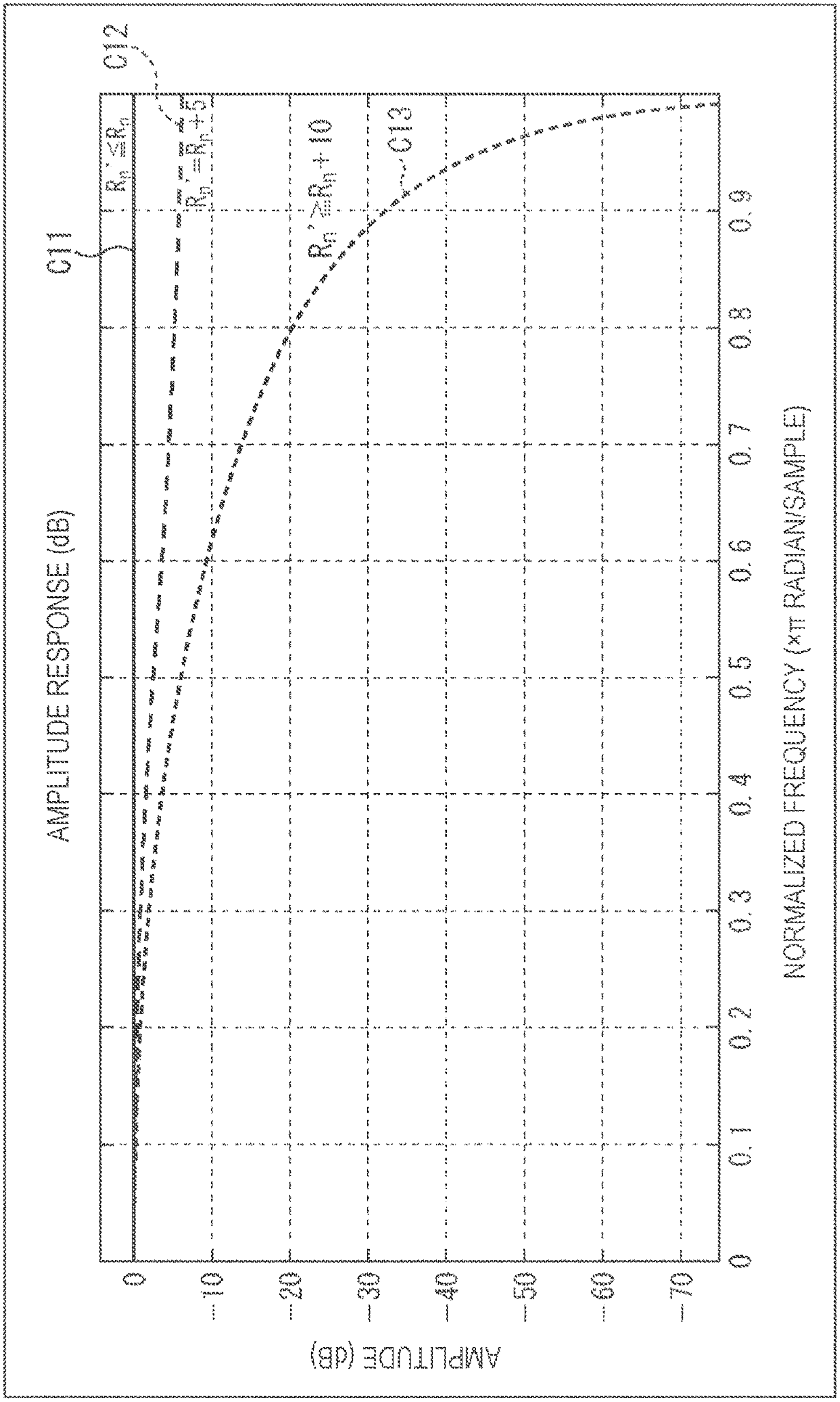
FIG. 3 is a graph showing frequency characteristics in frequency characteristic correction.

As a result of the calculation of the expressions (9) and (10) using the coefficients expressed by the expressions (11) to (13) in this manner, filtering of the frequency characteristics shown in FIG. 3 is performed. In FIG. 3, the horizontal axis represents normalized frequency, and the vertical axis represents amplitude, that is, the amount of attenuation of the waveform signals.

In FIG. 3, a line C11 shows the frequency characteristic where $R_n$' s $R_n$. In this case, the distance from the object to the assumed listening position is equal to or smaller than the distance from the object to the standard listening position. Specifically, the assumed listening position is at a position closer to the object than the standard listening position is, or the standard listening position and the assumed listening position are at the same distance from the object. In this case, the frequency components of the waveform signal is thus not particularly attenuated.

A curve C12 shows the frequency characteristic where $$R_n' = R_n + 5.$$

In this case, since the assumed listening position is slightly farther from the object than the standard listening position is, the high-frequency component of the waveform signal is slightly attenuated.

A curve C13 shows the frequency characteristic where $$R'_n \geq R_n + 10.$$

In this case, since the assumed listening position is much farther from the object than the standard listening position is, the high-frequency component of the waveform signal is largely attenuated.

As a result of performing the gain correction and the frequency characteristic correction depending on the distance from the object to the assumed listening position and attenuating the high-frequency component of the waveform signal of the object as described above, changes in the frequency characteristics and volumes due to a change in the listening position of the user can be reproduced.

After the gain correction and the frequency characteristic correction are performed by the gain/frequency characteristic correction unit 23 and the waveform signals $$W'_n[t]$$

of the respective objects are thus obtained, spatial acoustic characteristics are then added to the waveform signals $$W'_n[t]$$

by the spatial acoustic characteristic addition unit 24. For example, early reflections, reverberation characteristics or the like are added as the spatial acoustic characteristics to the waveform signals.

Specifically, for adding the early reflections and the reverberation characteristics to the waveform signals, a multi-tap delay process, a comb filtering process, and an all-pass filtering process are combined to achieve the addition of the early reflections and the reverberation characteristics.

Specifically, the spatial acoustic characteristic addition unit 24 performs the multi-tap delay process on each waveform signal on the basis of a delay amount and a gain amount determined from the position information of the object and the assumed listening position information, and adds the resulting signal to the original waveform signal to add the early reflection to the waveform signal.

In addition, the spatial acoustic characteristic addition unit 24 performs the comb filtering process on the waveform signal on the basis of the delay amount and the gain amount determined from the position information of the object and the assumed listening position information. The spatial acoustic characteristic addition unit 24 further performs the all-pass filtering process on the waveform signal resulting from the comb filtering process on the basis of the delay amount and the gain amount determined from the position information of the object and the assumed listening position information to obtain a signal for adding a reverberation characteristic.

Finally, the spatial acoustic characteristic addition unit 24 adds the waveform signal resulting from the addition of the early reflection and the signal for adding the reverberation characteristic to obtain a waveform signal having the early reflection and the reverberation characteristic added thereto, and outputs the obtained waveform signal to the rendering processor 25.

The addition of the spatial acoustic characteristics to the waveform signals by using the parameters determined according to the position information of each object and the assumed listening position information as described above allows reproduction of changes in spatial acoustics due to a change in the listening position of the user.

The parameters such as the delay amount and the gain amount used in the multi-tap delay process, the comb filtering process, the all-pass filtering process, and the like may be held in a table in advance for each combination of the position information of the object and the assumed listening position information.

In such a case, the spatial acoustic characteristic addition unit 24 holds in advance a table in which each position indicated by the position information is associated with a set of parameters such as the delay amount for each assumed listening position, for example. The spatial acoustic characteristic addition unit 24 then reads out a set of parameters determined from the position information of an object and the assumed listening position information from the table, and uses the parameters to add the spatial acoustic characteristics to the waveform signals.

Note that the set of parameters used for addition of the spatial acoustic characteristics may be held in a form of a table or may be hold in a form of a function or the like. In a case where a function is used to obtain the parameters, for example, the spatial acoustic characteristic addition unit 24 substitutes the position information and the assumed listening position information into a function held in advance to calculate the parameters to be used for addition of the spatial acoustic characteristics.

After the waveform signals to which the spatial acoustic characteristics are added are obtained for the respective objects as described above, the rendering processor 25 performs mapping of the waveform signals to the M respective channels to generate reproduction signals on M channels. In other words, rendering is performed.

Specifically, the rendering processor 25 obtains the gain amount of the waveform signal of each of the objects on each of the M channels through VBAP on the basis of the corrected position information, for example. The rendering processor 25 then performs a process of adding the waveform signal of each object multiplied by the gain amount obtained by the VBAP for each channel to generate reproduction signals of the respective channels.

Here, the VBAP will be described with reference to FIG. 4.

Figure 4:
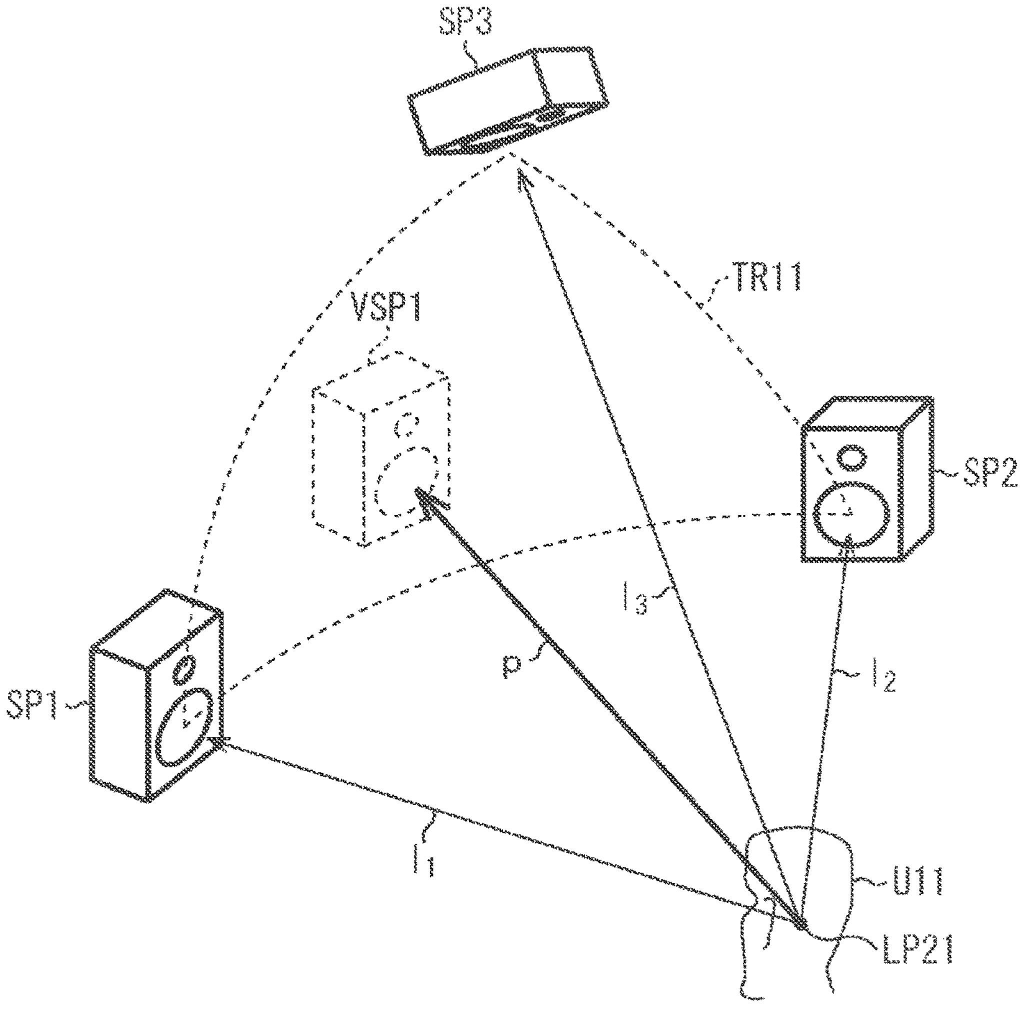
FIG. 4 is a diagram explaining VBAP.

As illustrated in FIG. 4, for example, assume that a user U11 listens to audio on three channels output from three speakers SP1 to SP3. In this example, the position of the head of the user U11 is a position LP21 corresponding to the assumed listening position.

A triangle TR11 on a spherical surface surrounded by the speakers SP1 to SP3 is called a mesh, and the VBAP allows a sound image to be localized at a certain position within the mesh.

Now assume that information indicating the positions of three speakers SP1 to SP3, which output audio on respective channels, is used to localize a sound image at a sound image position VSP1. Note that the sound image position VSP1 corresponds to the position of one object $OB_n$, more specifically to the position of an object $OB_n$ indicated by the corrected position information $$(A'_n, E'_n, R'_n).$$

For example, in a three-dimensional coordinate system having the origin at the position of the head of the user U11, that is, the position LP21, the sound image position VSP1 is expressed by using a three-dimensional vector p starting from the position LP21 (origin).

In addition, when three-dimensional vectors starting from the position LP21 (origin) and extending toward the positions of the respective speakers SP1 to SP3 are represented by vectors 11 to 13, the vector p can be expressed by the linear sum of the vectors 11 to 13 as expressed by the following expression (14).

[Mathematical Formula 14]

$$p = g_1 l_1 + g_2 l_2 + g_3 l_3 \tag{14}$$

Coefficients $g_1$ to $g_3$ by which the vectors 11 to 13 are multiplied in the expression (14) are calculated, and set to be the gain amounts of audio to be output from the speakers SP1 to SP3, respectively, that is, the gain amounts of the waveform signals, which allows the sound image to be localized at the sound image position VSP1. Specifically, the coefficients $g_1$ to coefficient $g_3$ to be the gain amounts can be obtained by calculating the following expression (15) on the basis of an inverse matrix $L_{123}^{-1}$ of the triangular mesh constituted by the three speakers SP1 to SP3 and the vector p indicating the position of the object $OB_n$.

[Mathematical Formula 15]

$$\begin{bmatrix} g_1 \\ g_2 \\ g_3 \end{bmatrix} = pL_{123}^{-1} = [R'_n \cdot \sin A'_n \cos E'_n \; R'_n \cdot \cos A'_n \cos E'_n \; R'_n \cdot \sin E'_n] \begin{bmatrix} l_{11} & l_{12} & l_{13} \\ l_{21} & l_{22} & l_{23} \\ l_{31} & l_{32} & l_{33} \end{bmatrix}^{-1} \tag{15}$$

In the expression (15), $$R'_n \sin A'_n \cos E'_n,\ R'_n \cos A'_n \cos E'_n, \text{ and } R'_n \sin E'_n,$$

which are elements of the vector p, represent the sound image position VSP1, that is, the x' coordinate, the y' coordinate, and the z' coordinate, respectively, on an x'y'z' coordinate system indicating the position of the object $OB_n$.

The x'y'z' coordinate system is an orthogonal coordinate system having an x' axis, a y' axis, and a z' axis parallel to the x axis, the y axis, and the z axis, respectively, of the xyz coordinate system shown in FIG. 2 and having the origin at a position corresponding to the assumed listening position, for example. The elements of the vector p can be obtained from the corrected position information $$(A'_n, E'_n, R'_n)$$

indicating the position of the object $OB_n$.

Furthermore, 111, 112, and 113 in the expression (15) are values of an x' component, a y' component, and a z' component, obtained by resolving the vector 11 toward the first speaker of the mesh into components of the x' axis, the y' axis, and the z' axis, respectively, and correspond to the x' coordinate, the y' coordinate, and the z' coordinate of the first speaker.

Similarly, 121, 122, and 123 are values of an x' component, a y' component, and a z' component, obtained by resolving the vector 12 toward the second speaker of the mesh into components of the x' axis, the y' axis, and the z' axis, respectively. Furthermore, 131, 132, and 133 are values of an x' component, a y' component, and a z' component, obtained by resolving the vector 13 toward the third speaker of the mesh into components of the x' axis, the y' axis, and the z' axis, respectively.

The technique of obtaining the coefficients $g_1$ to $g_3$ by using the relative positions of the three speakers SP1 to SP3 in this manner to control the localization position of a sound image is, in particular, called three-dimensional VBAP. In this case, the number M of channels of the reproduction signals is three or larger.

Since reproduction signals on M channels are generated by the rendering processor 25, the number of virtual speakers associated with the respective channels is M. In this case, for each of the objects $OB_n$, the gain amount of the waveform signal is calculated for each of the M channels respectively associated with the M speakers.

In this example, a plurality of meshes each constituted by M virtual speakers is placed in a virtual audio reproduction space. The gain amount of three channels associated with the three speakers constituting the mesh in which an object $OB_n$ is included is a value obtained by the aforementioned expression (15). In contrast, the gain amount of M-3 channels associated with the M-3 remaining speakers is 0.

After generating the reproduction signals on M channels as described above, the rendering processor 25 supplies the resulting reproduction signals to the convolution processor 26.

With the reproduction signals on M channels obtained in this manner, the way in which the sounds from the objects are heard at a desired assumed listening position can be reproduced in a more realistic manner. Although an example in which reproduction signals on M channels are generated through VBAP is described herein, the reproduction signals on M channels may be generated by any other technique.

The reproduction signals on M channels are signals for reproducing sound by an M-channel speaker system, and the audio processing device 11 further converts the reproduction signals on M channels into reproduction signals on two channels and outputs the resulting reproduction signals. In other words, the reproduction signals on M channels are downmixed to reproduction signals on two channels.

For example, the convolution processor 26 performs a BRIR (binaural room impulse response) process as a convolution process on the reproduction signals on M channels supplied from the rendering processor 25 to generate the reproduction signals on two channels, and outputs the resulting reproduction signals. Note that the convolution process on the reproduction signals is not limited to the BRIR process but may be any process capable of obtaining reproduction signals on two channels.

When the reproduction signals on two channels are to be output to headphones, a table holding impulse responses from various object positions to the assumed listening position may be provided in advance. In such a case, an impulse response associated with the position of an object to the assumed listening position is used to combine the waveform signals of the respective objects through the BRIR process, which allows the way in which the sounds output from the respective objects are heard at a desired assumed listening position to be reproduced.

For this method, however, impulse responses associated with quite a large number of points (positions) have to be held. Furthermore, as the number of objects is larger, the BRIR process has to be performed the number of times corresponding to the number of objects, which increases the processing load.

Thus, in the audio processing device 11, the reproduction signals (waveform signals) mapped to the speakers of M virtual channels by the rendering processor 25 are downmixed to the reproduction signals on two channels through the BRIR process using the impulse responses to the ears of a user (listener) from the M virtual channels. In this case, only impulse responses from the respective speakers of M channels to the ears of the listener need to be held, and the number of times of the BRIR process is for the M channels even when a large number of objects are present, which reduces the processing load.

<Explanation of Reproduction Signal Generation Process>

Subsequently, a process flow of the audio processing device 11 described above will be explained. Specifically, the reproduction signal generation process performed by the audio processing device 11 will be explained with reference to the flowchart of FIG. 5.

In step S11, the input unit 21 receives input of an assumed listening position. When the user has operated the input unit 21 to input the assumed listening position, the input unit 21 supplies assumed listening position information indicating the assumed listening position to the position information correction unit 22 and the spatial acoustic characteristic addition unit 24.

In step S12, the position information correction unit 22 calculates corrected position information $$(A'_n, E'_n, R'_n)$$

on the basis of the assumed listening position information supplied from the input unit 21 and the externally supplied position information of respective objects, and supplies the resulting corrected position information to the gain/frequency characteristic correction unit 23 and the rendering processor 25. For example, the aforementioned expressions (1) to (3) or (4) to (6) are calculated so that the corrected position information of the respective objects is obtained.

In step S13, the gain/frequency characteristic correction unit 23 performs gain correction and frequency characteristic correction of the externally supplied waveform signals of the objects on the basis of the corrected position information supplied from the position information correction unit 22 and the position information supplied externally.

For example, the aforementioned expressions (9) and (10) are calculated so that waveform signals $$W'_n[t]$$

of the respective objects are obtained. The gain/frequency characteristic correction unit 23 supplies the obtained waveform signals $$W'_n[t]$$

of the respective objects to the spatial acoustic characteristic addition unit 24.

In step S14, the spatial acoustic characteristic addition unit 24 adds spatial acoustic characteristics to the waveform signals supplied from the gain/frequency characteristic correction unit 23 on the basis of the assumed listening position information supplied from the input unit 21 and the externally supplied position information of the objects, and supplies the resulting waveform signals to the rendering processor 25. For example, early reflections, reverberation characteristics or the like are added as the spatial acoustic characteristics to the waveform signals.

In step S15, the rendering processor 25 performs mapping on the waveform signals supplied from the spatial acoustic characteristic addition unit 24 on the basis of the corrected position information supplied from the position information correction unit 22 to generate reproduction signals on M channels, and supplies the generated reproduction signals to the convolution processor 26. Although the reproduction signals are generated through the VBAP in the process of step S15, for example, the reproduction signals on M channels may be generated by any other technique.

In step S16, the convolution processor 26 performs convolution process on the reproduction signals on M channels supplied from the rendering processor 25 to generate reproduction signals on 2 channels, and outputs the generated reproduction signals. For example, the aforementioned BRIR process is performed as the convolution process.

When the reproduction signals on two channels are generated and output, the reproduction signal generation process is terminated.

As described above, the audio processing device 11 calculates the corrected position information on the basis of the assumed listening position information, and performs the gain correction and the frequency characteristic correction of the waveform signals of the respective objects and adds spatial acoustic characteristics on the basis of the obtained corrected position information and the assumed listening position information.

As a result, the way in which sounds output from the respective object positions are heard at any assumed listening position can be reproduced in a realistic manner. This allows the user to freely specify the sound listening position according to the user's preference in reproduction of a content, which achieves a more flexible audio reproduction.

Second Embodiment

<Example Configuration of Audio Processing Device>

Although an example in which the user can specify any assumed listening position has been explained above, not only the listening position but also the positions of the respective objects may be allowed to be changed (modified) to any positions.

Figure 6:
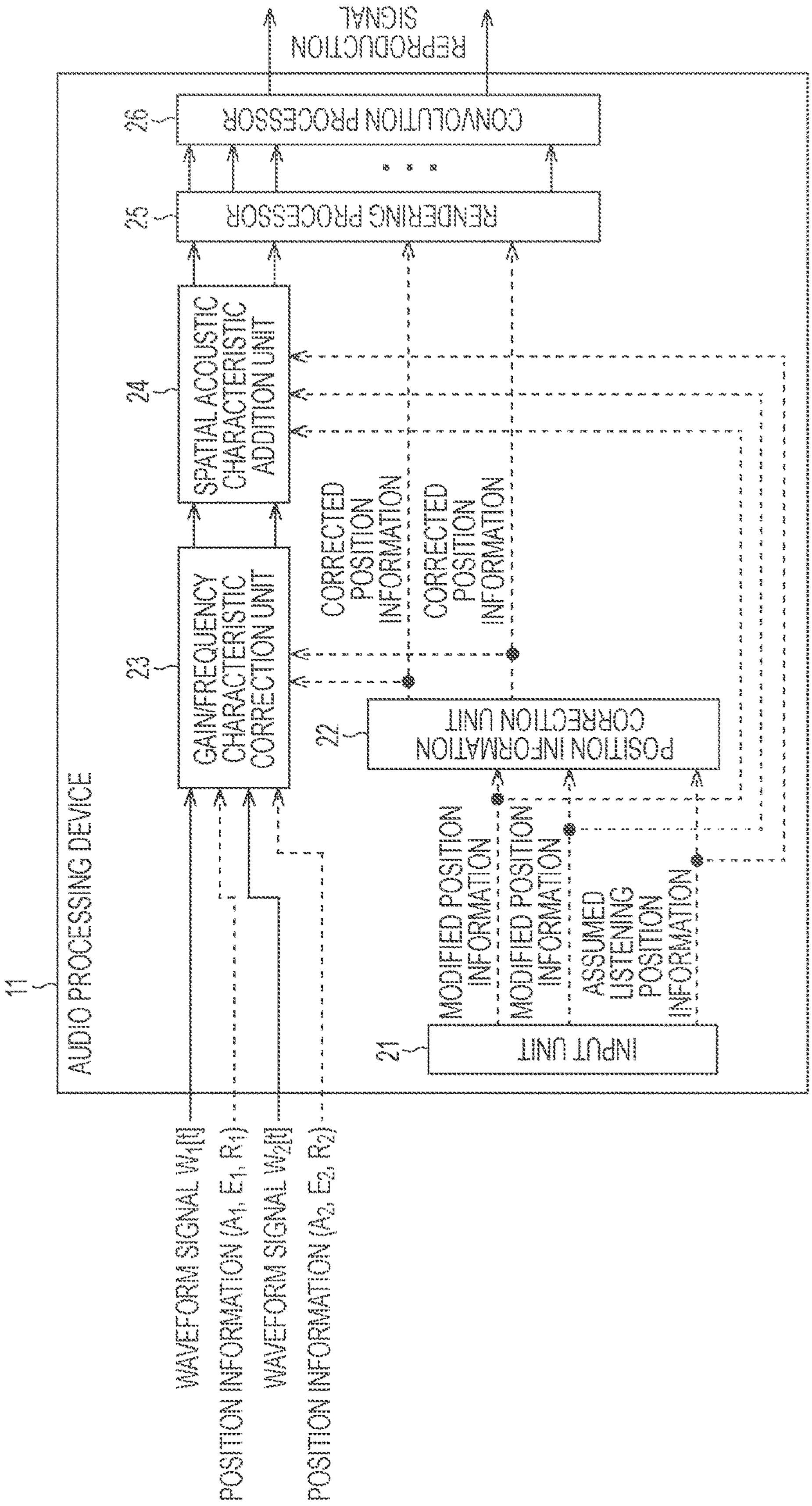
FIG. 6 is a diagram illustrating a configuration of an audio processing device.

In such a case, the audio processing device 11 is configured as illustrated in FIG. 6, for example. In FIG. 6, parts corresponding to those in FIG. 1 are designated by the same reference numerals, and the description thereof will not be repeated as appropriate.

The audio processing device 11 illustrated in FIG. 6 includes an input unit 21, a position information correction unit 22, a gain/frequency characteristic correction unit 23, a spatial acoustic characteristic addition unit 24, a rendering processor 25, and a convolution processor 26, similarly to that of FIG. 1.

With the audio processing device 11 illustrated in FIG. 6, however, the input unit 21 is operated by the user and modified positions indicating the positions of respective objects resulting from modification (change) are also input in addition to the assumed listening position. The input unit 21 supplies the modified position information indicating the modified positions of each object as input by the user to the position information correction unit 22 and the spatial acoustic characteristic addition unit 24.

For example, the modified position information is information including the azimuth angle $A_n$, the elevation angle $E_n$, and the radius $R_n$ of an object $OB_n$ as modified relative to the standard listening position, similarly to the position information. Note that the modified position information may be information indicating the modified (changed) position of an object relative to the position of the object before modification (change).

The position information correction unit 22 also calculates corrected position information on the basis of the assumed listening position information and the modified position information supplied from the input unit 21, and supplies the resulting corrected position information to the gain/frequency characteristic correction unit 23 and the rendering processor 25. In a case where the modified position information is information indicating the position relative to the original object position, for example, the corrected position information is calculated on the basis of the assumed listening position information, the position information, and the modified position information.

The spatial acoustic characteristic addition unit 24 adds spatial acoustic characteristics to the waveform signals supplied from the gain/frequency characteristic correction unit 23 on the basis of the assumed listening position information and the modified position information supplied from the input unit 21, and supplies the resulting waveform signals to the rendering processor 25.

It has been described above that the spatial acoustic characteristic addition unit 24 of the audio processing device 11 illustrated in FIG. 1 holds in advance a table in which each position indicated by the position information is associated with a set of parameters for each piece of assumed listening position information, for example.

In contrast, the spatial acoustic characteristic addition unit 24 of the audio processing device 11 illustrated in FIG. 6 holds in advance a table in which each position indicated by the modified position information is associated with a set of parameters for each piece of assumed listening position information. The spatial acoustic characteristic addition unit 24 then reads out a set of parameters determined from the assumed listening position information and the modified position information supplied from the input unit 21 from the table for each of the objects, and uses the parameters to perform a multi-tap delay process, a comb filtering process, an all-pass filtering process, and the like and add spatial acoustic characteristics to the waveform signals.

<Explanation of Reproduction Signal Generation Process>

Figure 7:
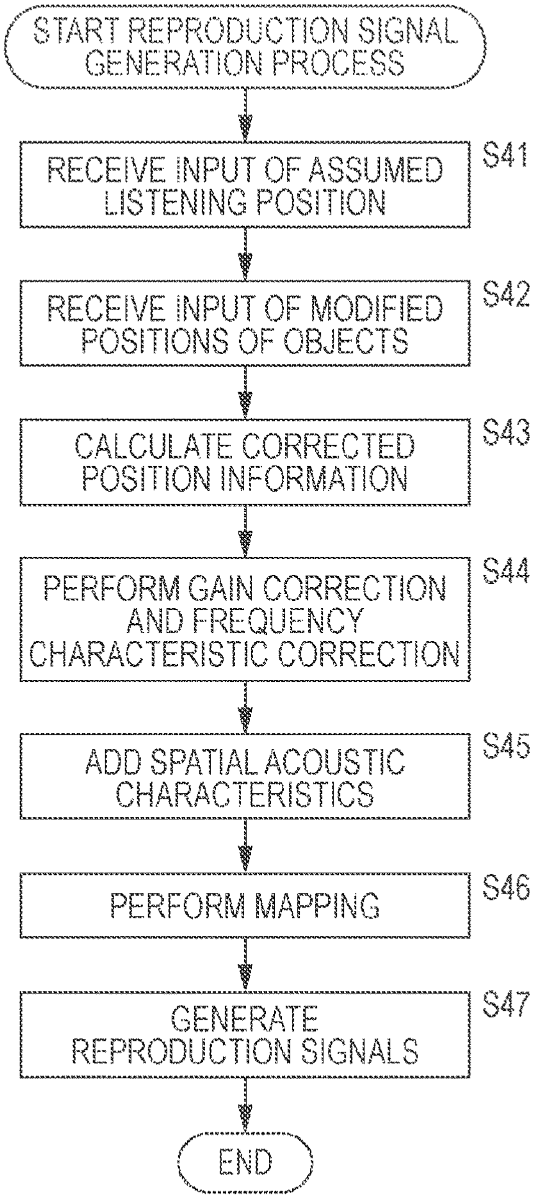
FIG. 7 is a flowchart explaining a reproduction signal generation process.

Next, a reproduction signal generation process performed by the audio processing device 11 illustrated in FIG. 6 will be explained with reference to the flowchart of FIG. 7. Since the process of step S41 is the same as that of step S11 in FIG. 5, the explanation thereof will not be repeated.

In step S42, the input unit 21 receives input of modified positions of the respective objects. When the user has operated the input unit 21 to input the modified positions of the respective objects, the input unit 21 supplies modified position information indicating the modified positions to the position information correction unit 22 and the spatial acoustic characteristic addition unit 24.

In step S43, the position information correction unit 22 calculates corrected position information $$(A'_n, E'_n, R'_n)$$

on the basis of the assumed listening position information and the modified position information supplied from the input unit 21, and supplies the resulting corrected position information to the gain/frequency characteristic correction unit 23 and the rendering processor 25.

In this case, the azimuth angle, the elevation angle, and the radius of the position information are replaced by the azimuth angle, the elevation angle, and the radius of the modified position information in the calculation of the aforementioned expressions (1) to (3), for example, and the corrected position information is obtained. Furthermore, the position information is replaced by the modified position information in the calculation of the expressions (4) to (6).

Figure 5:
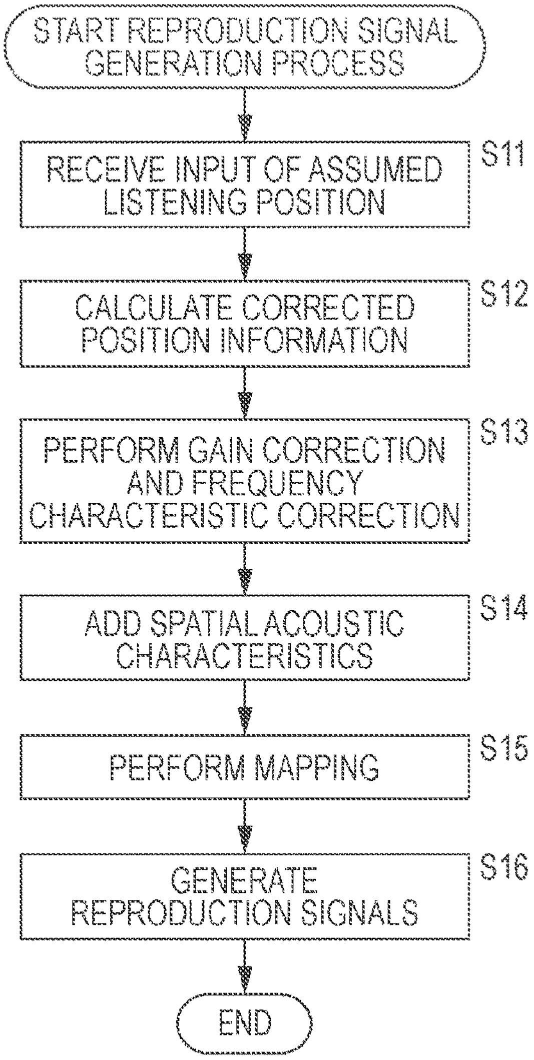
FIG. 5 is a flowchart explaining a reproduction signal generation process.

A process of step S44 is performed after the modified position information is obtained, which is the same as the process of step S13 in FIG. 5 and the explanation thereof will thus not be repeated.

In step S45, the spatial acoustic characteristic addition unit 24 adds spatial acoustic characteristics to the waveform signals supplied from the gain/frequency characteristic correction unit 23 on the basis of the assumed listening position information and the modified position information supplied from the input unit 21, and supplies the resulting waveform signals to the rendering processor 25.

Processes of steps S46 and S47 are performed and the reproduction signal generation process is terminated after the spatial acoustic characteristics are added to the waveform signals, which are the same as those of steps S15 and S16 in FIG. 5 and the explanation thereof will thus not be repeated.

As described above, the audio processing device 11 calculates the corrected position information on the basis of the assumed listening position information and the modified position information, and performs the gain correction and the frequency characteristic correction of the waveform signals of the respective objects and adds spatial acoustic characteristics on the basis of the obtained corrected position information, the assumed listening position information, and the modified position information.

As a result, the way in which sound output from any object position is heard at any assumed listening position can be reproduced in a realistic manner. This allows the user to not only freely specify the sound listening position but also freely specify the positions of the respective objects according to the user's preference in reproduction of a content, which achieves a more flexible audio reproduction.

For example, the audio processing device 11 allows reproduction of the way in which sound is heard when the user has changed components such as a singing voice, sound of an instrument or the like or the arrangement thereof. The user can therefore freely move components such as instruments and singing voices associated with respective objects and the arrangement thereof to enjoy music and sound with the arrangement and components of sound sources matching his/her preference.

Furthermore, in the audio processing device 11 illustrated in FIG. 6 as well, similarly to the audio processing device 11 illustrated in FIG. 1, reproduction signals on M channels are once generated and then converted (downmixed) to reproduction signals on two channels, so that the processing load can be reduced.

The series of processes described above can be performed either by hardware or by software. When the series of processes described above is performed by software, programs constituting the software are installed in a computer. Note that examples of the computer include a computer embedded in dedicated hardware and a general-purpose computer capable of executing various functions by installing various programs therein.

Figure 8:
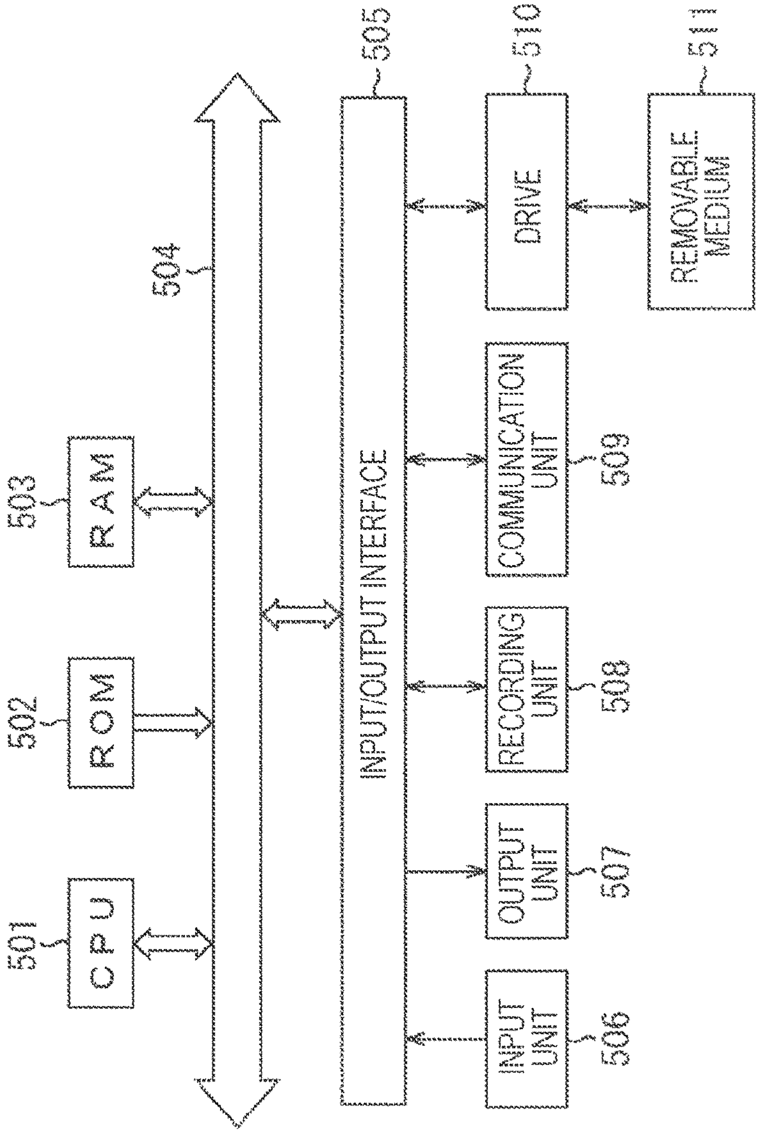
FIG. 8 is a diagram illustrating an example configuration of a computer.

FIG. 8 is a block diagram showing an example structure of the hardware of a computer that performs the above described series of processes in accordance with programs.

In the computer, a central processing unit (CPU) 501, a read only memory (ROM) 502, and a random access memory (RAM) 503 are connected to one another by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an image sensor, and the like. The output unit 507 includes a display, a speaker, and the like. The recording unit 508 is a hard disk, a nonvolatile memory, or the like. The communication unit 509 is a network interface or the like. The drive 510 drives a removable medium 511 such as a magnetic disk, an optical disk, a magnetooptical disk, or a semiconductor memory.

In the computer having the above described structure, the CPU 501 loads a program recorded in the recording unit 508 into the RAM 503 via the input/output interface 505 and the bus 504 and executes the program, for example, so that the above described series of processes are performed.

Programs to be executed by the computer (CPU 501) may be recorded on a removable medium 511 that is a package medium or the like and provided therefrom, for example. Alternatively, the programs can be provided via a wired or wireless transmission medium such as a local area network, the Internet, or digital satellite broadcasting.

In the computer, the programs can be installed in the recording unit 508 via the input/output interface 505 by mounting the removable medium 511 on the drive 510. Alternatively, the programs can be received by the communication unit 509 via a wired or wireless transmission medium and installed in the recording unit 508. Still alternatively, the programs can be installed in advance in the ROM 502 or the recording unit 508. Programs to be executed by the computer may be programs for carrying out processes in chronological order in accordance with the sequence described in this specification, or programs for carrying out processes in parallel or at necessary timing such as in response to a call.

Furthermore, embodiments of the present technology are not limited to the embodiments described above, but various modifications may be made thereto without departing from the scope of the technology.

For example, the present technology can be configured as cloud computing in which one function is shared by multiple devices via a network and processed in cooperation.

In addition, the steps explained in the above flowcharts can be performed by one device and can also be shared among multiple devices.

Furthermore, when multiple processes are included in one step, the processes included in the step can be performed by one device and can also be shared among multiple devices.

The effects mentioned herein are exemplary only and are not limiting, and other effects may also be produced.

Furthermore, the present technology can have the following configurations.

(1)

An audio processing device including: a position information correction unit configured to calculate corrected position information indicating a position of a sound source relative to a listening position at which sound from the sound source is heard, the calculation being based on position information indicating the position of the sound source and listening position information indicating the listening position; and a generation unit configured to generate a reproduction signal reproducing sound from the sound source to be heard at the listening position, based on a waveform signal of the sound source and the corrected position information.

(2)

The audio processing device described in (1), wherein the position information correction unit calculates the corrected position information based on modified position information indicating a modified position of the sound source and the listening position information.

(3)

The audio processing device described in (1) or (2), further including a correction unit configured to perform at least one of gain correction and frequency characteristic correction on the waveform signal depending on a distance from the sound source to the listening position.

(4)

The audio processing device described in (2), further including a spatial acoustic characteristic addition unit configured to add a spatial acoustic characteristic to the waveform signal, based on the listening position information and the modified position information.

(5)

The audio processing device described in (4), wherein the spatial acoustic characteristic addition unit adds at least one of early reflection and a reverberation characteristic as the spatial acoustic characteristic to the waveform signal.

(6)

The audio processing device described in (1), further including a spatial acoustic characteristic addition unit configured to add a spatial acoustic characteristic to the waveform signal, based on the listening position information and the position information.

(7)

The audio processing device described in any one of (1) to (6), further including a convolution processor configured to perform a convolution process on the reproduction signals on two or more channels generated by the generation unit to generate reproduction signals on two channels.

(8)

An audio processing method including the steps of: calculating corrected position information indicating a position of a sound source relative to a listening position at which sound from the sound source is heard, the calculation being based on position information indicating the position of the sound source and listening position information indicating the listening position; and generating a reproduction signal reproducing sound from the sound source to be heard at the listening position, based on a waveform signal of the sound source and the corrected position information.

(9)

A program causing a computer to execute processing including the steps of: calculating corrected position information indicating a position of a sound source relative to a listening position at which sound from the sound source is heard, the calculation being based on position information indicating the position of the sound source and listening position information indicating the listening position; and generating a reproduction signal reproducing sound from the sound source to be heard at the listening position, based on a waveform signal of the sound source and the corrected position information.

REFERENCE SIGNS LIST

11 Audio processing device
21 Input unit
22 Position information correction unit
23 Gain/frequency characteristic correction unit
24 Spatial acoustic characteristic addition unit
25 Rendering processor
26 Convolution processor

What is claimed is:

1. An audio processing device, comprising:
- a position information correction unit configured to calculate corrected position information that indicates a first position of a sound source relative to a listening position at which sound from the sound source is heard, wherein
  - the corrected position information is calculated based on position information and listening position information,
  - the position information indicates a second position of the sound source relative to a standard listening position, and
  - the listening position information indicates the listening position; and
- a generation unit configured to:
  - perform three-dimensional vector base amplitude panning (VBAP) on a waveform signal of the sound source to generate reproduction signals on M channels, wherein
    - the M is three or more, and
    - the reproduction signals on the M channels are generated based on the corrected position information supplied from the position information correction unit; and
  - convert the reproduction signals on the M channels into reproduction signals on two channels.

2. The audio processing device according to claim 1, wherein the reproduction signals on the two channels are reproduction signals for one of a headphone or an earphone.

3. The audio processing device according to claim 1, wherein the generation unit is further configured to perform a binaural room impulse response (BRIR) process to generate the reproduction signals on the two channels for one of a headphone or an earphone from the reproduction signals on the M channels.

4. The audio processing device according to claim 1, further comprising a spatial acoustic characteristic addition unit configured to add a spatial acoustic characteristic to the waveform signal of the sound source based on the listening position information and the position information.

5. The audio processing device according to claim 4, wherein the spatial acoustic characteristic addition unit is further configured to add at least one of early reflection or a reverberation characteristic as the spatial acoustic characteristic to the waveform signal of the sound source.

6. An audio processing method, comprising:
- in an audio processing device:
  - calculating corrected position information that indicates a first position of a sound source relative to a listening position at which sound from the sound source is heard, wherein
    - the corrected position information is calculated based on position information and listening position information,
    - the position information indicates a second position of the sound source relative to a standard listening position, and
    - the listening position information indicates the listening position;
  - performing three-dimensional vector base amplitude panning (VBAP) on a waveform signal of the sound source to generate reproduction signals on M channels, wherein
    - the M is three or more, and
    - the reproduction signals on the M channels are generated based on the corrected position information; and
  - converting the reproduction signals on the M channels into reproduction signals on two channels.

7. The audio processing method according to claim 6, wherein the reproduction signals on the two channels are reproduction signals for one of a headphone or an earphone.

8. The audio processing method according to claim 6, further comprising performing a binaural room impulse response (BRIR) process to generate the reproduction signals on the two channels for one of a headphone or an earphone from the reproduction signals on the M channels.

9. The audio processing method according to claim 6, further comprising adding a spatial acoustic characteristic to the waveform signal of the sound source based on the listening position information and the position information.

10. The audio processing method according to claim 9, further comprising adding at least one of early reflection or a reverberation characteristic as the spatial acoustic characteristic to the waveform signal of the sound source.

11. A non-transitory computer-readable medium having stored thereon computer-executable instructions that, when executed by a processor, cause the processor to execute operations, the operations comprising:
- calculating corrected position information that indicates a first position of a sound source relative to a listening position at which sound from the sound source is heard, wherein
  - the corrected position information is calculated based on position information and listening position information, the position information indicates a second position of the sound source relative to a standard listening position, and the listening position information indicates the listening position;

performing three-dimensional vector base amplitude panning (VBAP) on a waveform signal of the sound source to generate reproduction signals on M channels, wherein the M is three or more, and the reproduction signals on the M channels are generated based on the corrected position information; and converting the reproduction signals on the M channels into reproduction signals on two channels.

12. The non-transitory computer-readable medium according to claim 11, wherein the reproduction signals on the two channels are reproduction signals for one of a headphone or an earphone.

13. The non-transitory computer-readable medium according to claim 11, further comprising performing a binaural room impulse response (BRIR) process to generate the reproduction signals on the two channels for one of a headphone or an earphone from the reproduction signals on the M channels.

14. The non-transitory computer-readable medium according to claim 11, further comprising adding a spatial acoustic characteristic to the waveform signal of the sound source based on the listening position information and the position information.

15. The non-transitory computer-readable medium according to claim 14, further comprising adding at least one of early reflection or a reverberation characteristic as the spatial acoustic characteristic to the waveform signal of the sound source.

* * * * *